H. F. HOFFMAN.
HEADLIGHT OPERATING SYSTEM.
APPLICATION FILED MAY 6, 1916.

1,217,942.

Patented Mar. 6, 1917.
2 SHEETS—SHEET 1.

Inventor
H. F. Hoffman
By
Attorneys.

H. F. HOFFMAN.
HEADLIGHT OPERATING SYSTEM.
APPLICATION FILED MAY 6, 1916.
1,217,942.
Patented Mar. 6, 1917.
2 SHEETS—SHEET 2.
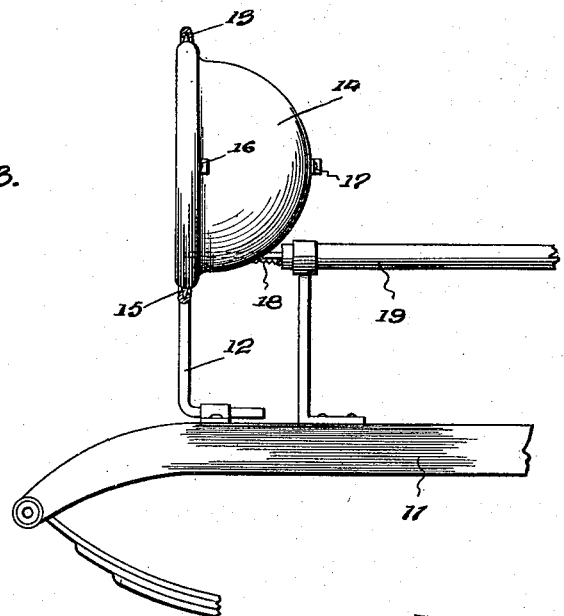
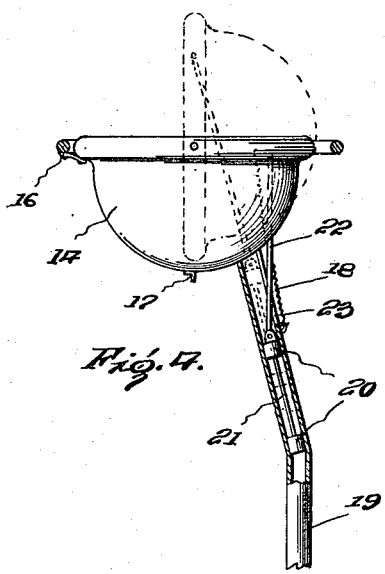
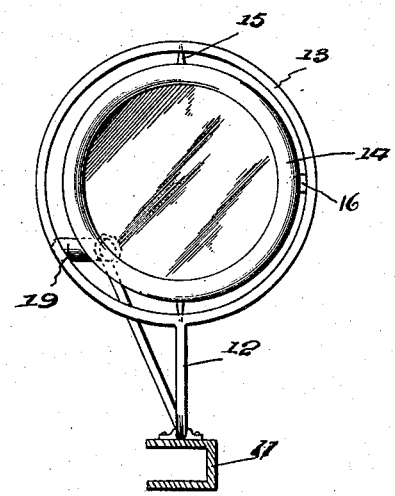
Inventor
H. F. Hoffman.
By
Attorneys

UNITED STATES PATENT OFFICE.

HARRY F. HOFFMAN, OF ALLENTOWN, PENNSYLVANIA.

HEADLIGHT-OPERATING SYSTEM.

1,217,942.   Specification of Letters Patent.   Patented Mar. 6, 1917.

Original application filed February 15, 1916, Serial No. 78,504. Divided and this application filed May 6, 1916. Serial No. 95,855.

*To all whom it may concern:*

Be it known that I, HARRY F. HOFFMAN, a citizen of the United States, residing at Allentown, in the county of Lehigh and State of Pennsylvania, have invented certain new and useful Improvements in Headlight-Operating Systems, of which the following is a specification.

My invention relates to new and useful improvements in dirigible headlights for motor vehicles and more particularly to the manner of mounting the headlights for turning movement and with the means for revolving them, as desired, being a division of my copending application filed Feb. 15, 1916, Serial No. 78,504.

One of the objects of my present invention consists in the provision of a pair of headlights disposed one at either side of the vehicle and each so mounted that while it normally is directed forwardly along the path of movement of the vehicle it may be swung outwardly to cast its light to the side of the road, the lights each being mounted for swinging movement of ninety degrees about a vertical axis.

Because of this manner of mounting the lights, the driver is enabled to illuminate the side of the road when passing other vehicles, thereby avoiding the necessity of using dimmers. Furthermore, he is enabled to light up turns in a road and at crossings one light may be set ahead and the other turned to the side in order to give the driver a clear vision of the intersecting streets. Furthermore, lights so mounted are of assistance in locating houses, sign posts and the like and may be used to indicate the driver's intention to turn in one direction or the other.

A further object of my invention consists in providing means for operating and controlling the lights independently of each other from the driver's seat. I employ fluid pressure means for operating and controlling the lights in which the motive fluid is a gas, and a still further object of my invention resides in the provision of controlling valves so arranged that either light may be controlled either by hand or foot, as desired.

With these and other objects in view, my invention will be more fully described, illustrated in the accompanying drawings, and then specifically pointed out in the claims which are attached to and form a part of this application.

In the drawings:

Fig. 3 is a side elevation of one of the headlights, showing the manner of mounting it for turning movement and also the manner in which it is actuated;

Fig. 4 is a top plan view, partially in section, of the structure shown in Fig. 3;

Fig. 5 is a front elevation of the lamp and its supporting mechanism;

Corresponding and like parts are referred to in the following description and indicated in all the views of the drawings by the same reference characters.

Figure 1:
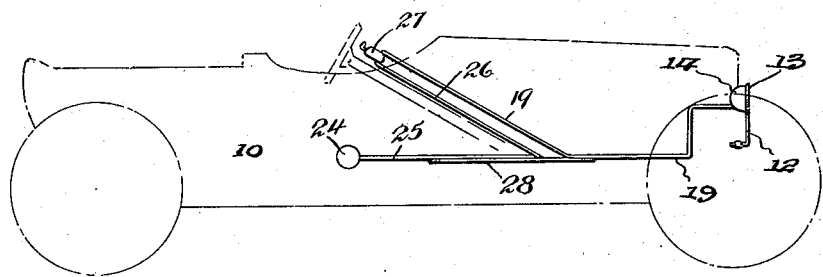
Figure 1 is a side elevation of a conventional form of motor vehicle, showing my dirigible headlights in place.
Figure 2:
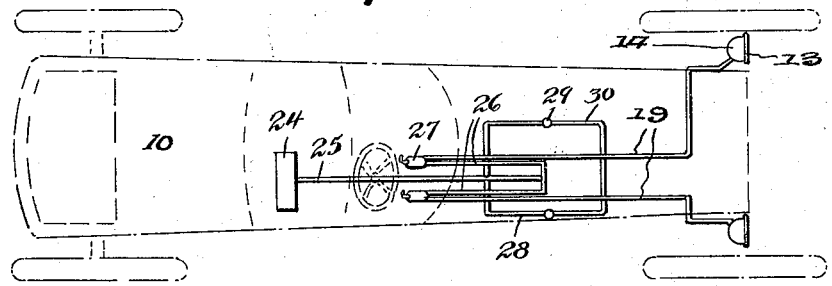
Fig. 2 is a top plan view of the structure shown in Fig. 1.

In order to insure a clear and accurate understanding of my invention and its operation, I have illustrated it in connection with a conventional form of motor vehicle 10 having side frames 11 to the forward portions of which I secure my headlight supporting brackets 12. Each of these brackets includes a standard portion which is secured to the side frame of the vehicle and a ring-shaped body portion 13 which encircles the light 14. This body portion 13, at opposite sides, is provided with vertically alined sockets to receive trunnions 15 formed upon the light in such a manner that the light is freely supported within the ring for rotation about its vertical axis. Each light, at one side, is provided with an extension or stop 16 which engages the ring 13 when the light is directed ahead to prevent its overswinging inwardly and each light is further provided at its rear with a second extension or stop 17 which engages the ring when the light has been swung outwardly through an angle of ninety degrees to prevent over-rotation in an outward direction. A spring 18, secured to the light at one end and to any suitable fixed body at its other, serves to normally hold the light in its forwardly directed position. Obviously, any other type of spring may be utilized for the same purpose.

Pipes 19 lead from points near the rear of the lights rearwardly to certain controlling devices located conveniently for the driver of the vehicle and pistons are mounted for movement in the free open forward ends of these pipes. Each piston includes spaced piston heads 20 connected by a piston rod 21. A rigid link 22 is pivotally connected to the outermost of these piston heads and to the light in such a manner that reciprocation of the piston in the pipe will cause swinging of the light to which it is connected. As shown in Fig. 4, the pipe adjacent its free end is slotted, as at 23, to permit proper movement of the link 22. Obviously, assuming that the light is directed ahead and held in such position by the spring 18, pressure directed against the piston, either by supplying a gas under pressure to the pipe or by forcing a liquid into the pipe, will cause outward movement of the piston and turning of the light. The light at the right of the vehicle is, of course, arranged to turn outwardly toward the right, while that at the left is arranged to turn in the opposite direction.

In installing my dirigible headlights, I provide a compressed air reservoir 24, which may be mounted in any convenient part of the vehicle and from which leads a pipe 25 provided with branches 26 leading to hand operated valves 27 and with branches 28 leading to foot operated valves 29. The pipes 19 lead to the outlet ports of the hand operated valves and pipes 30 lead from the foot operated valves to these pipes 19. It will, of course, be understood that the hand operated valves are preferably located adjacent the steering wheel, being secured to the steering column in any suitable manner and that the foot operated valves are located upon the floor of the vehicle near the dash.

Each of the hand operated valves includes a casing 31 having inlet and outlet ports 32 and 33 preferably disposed in alinement with each other and passing through threaded nipples by means of which the pipes are connected to the valves. Rotatably mounted in the casing is the valve 34 which is of the turn plug type and provided with a diametrical passage 35, which, in one position of the valve, establishes communication between the pipes. This valve plug is also formed with a passage 36 which communicates with the intermediate portion of the passage 35 and which, in one position of the valve, also communicates with the outlet pipe. In this latter position of the valve one end of the passage 35 also alines with a vent port 37 formed in the valve casing.

Figure 6:
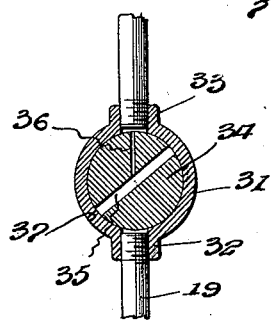
Fig. 6 is a sectional view of the hand operated valve employed with the system shown in Fig. 1.
Figure 7:
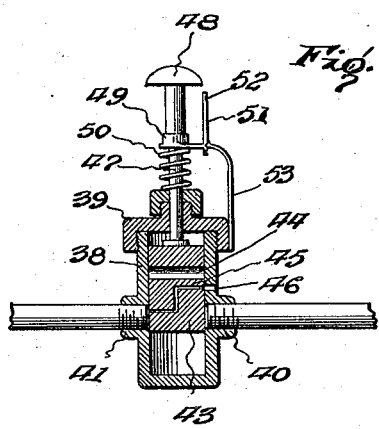
Fig. 7 is a corresponding view of the foot operated valve employed with the system shown in Fig. 1.

It will, therefore, be seen that by turning the valve to bring its passage 35 into alinement with the inlet and outlet ports, air may be permitted to pass from the reservoir into one of the pipes 19 to swing the light with which such pipe coöperates and that upon turning of the valve to the position shown in Fig. 6, supply of air to the pipe 19 will be cut off and the air in such pipe vented to the atmosphere. At the same time by swinging the valve a little farther to closed position, supply of air to the pipe 19 will still be cut off and the communication between this pipe 19 and the atmosphere will be closed. This is necessary as it would otherwise be impossible to operate a light by the foot control valve as air admitted to the pipe 19 would vent through the hand control valve.

Each of the foot operated control valves includes a cylinder 38 having an integral closure at one end and a removable cap 39 at its other. This cylinder is formed at diametrically opposite points with inlet and outlet ports 40 and 41 passing through integrally threaded nipples by means of which the pipes are connected. Reciprocally mounted in the cylinder is the piston valve 43 which is formed with a diametrical passage 44 which in lowered position of the valve establishes communication between the ports in the valve casing. This valve is also provided with a second passage 45 which in almost fully closed position of the valve establishes communication between the pipe 19 and a vent port 46 formed in the valve casing, this communication being cut off when the valve is fully closed. The valve is provided with a valve stem 47 which projects through the cap 39 and carries a foot piece 48. A collar 49 secured to the valve stem serves as an abutment for a spring 50 which normally holds the valve in raised position. This collar is formed with a vertical arm 51 having a plurality of notches 52 which coöperate with a spring 53 secured to the casing and which serves as a means for indicating the position of the valve.

In operation when either light is to be turned outwardly, air is supplied to its pipe 19 either by opening the proper hand operated control valve or the proper foot operated control valve as happens to be more convenient. When the light is to be returned to its original position the hand operated valve, if employed in actuating the light, is turned to such position as to vent the pipe 19 to the atmosphere and is held in this position until the light returns to normal position after which the valve is fully closed. In like manner, if the foot operated valve is employed in turning the light, the light would be released by releasing the foot operated valve until it had moved to partially closed position to vent the pipe 19 and then further releasing it until its spring has fully closed it.

Having thus described the invention, what is claimed as new is:

1. A dirigible headlight system for motor vehicles including a pair of headlights adapted to be mounted for limited turning movement about their vertical axes at either side of the vehicle, a source of compressed air, pipes leading from points adjacent the lights and each in double and independent communication with the source of air supply, hand operated valves controlling one communication between the air supply and the pipes, foot controlled valves controlling the other communication between the source of air supply and the pipes, pistons slidably mounted in the pipes, and operative connections between the pistons and lights.

2. A dirigible headlight for vehicles including a headlight mounted for turning movement, a source of compressed fluid supply, a pipe disposed with one end adjacent the headlight, a piston mounted in such end of the pipe and operatively connected to the headlight, a hand operated valve, a foot operated valve, pipes leading one from each of the valves to the first mentioned pipe, a pipe leading from the source of compressed fluid supply to one of the valves, and a branch pipe leading from the last named pipe to the other valve.

In testimony whereof I affix my signature.

HARRY F. HOFFMAN. [L. S.]

Copies of this patent may be obtained for five cents each, by addressing the "Commissioner of Patents, Washington, D. C."